US010715862B2

(12) United States Patent
Li et al.

(10) Patent No.: US 10,715,862 B2
(45) Date of Patent: Jul. 14, 2020

(54) METHOD AND SYSTEM FOR IDENTIFYING RELEVANT MEDIA CONTENT

(71) Applicant: VISENZE PTE LTD, Singapore (SG)

(72) Inventors: Guangda Li, Singapore (SG); Zheng Song, Singapore (SG); Fan Xu, Singapore (SG)

(73) Assignee: VISENZE PTE LTD, Singapore (SG)

( * ) Notice: Subject to any disclaimer, the term of this patent is extended or adjusted under 35 U.S.C. 154(b) by 0 days.

(21) Appl. No.: 15/553,578

(22) PCT Filed: Feb. 24, 2015

(86) PCT No.: PCT/SG2015/000053
§ 371 (c)(1),
(2) Date: Aug. 24, 2017

(87) PCT Pub. No.: WO2016/137389
PCT Pub. Date: Sep. 1, 2016

(65) Prior Publication Data

US 2018/0249205 A1 Aug. 30, 2018

(51) Int. Cl.
*H04N 21/488* (2011.01)
*H04N 21/84* (2011.01)
(Continued)

(52) U.S. Cl.
CPC ..... *H04N 21/44008* (2013.01); *G06K 9/6201* (2013.01); *H04N 21/488* (2013.01);
(Continued)

(58) Field of Classification Search
None
See application file for complete search history.

(56) References Cited

U.S. PATENT DOCUMENTS 8,315,423 B1 11/2012 Jing et al.
2006/0227992 A1 10/2006 Rathus et al.
(Continued)

FOREIGN PATENT DOCUMENTS

CN 101753913 A 6/2010
CN 103984699 A 8/2014
(Continued)

OTHER PUBLICATIONS

International search report and written opinion of the international searching authority for co-pending PCT application No. PCT/SG2015/000053 dated May 28, 2015.
(Continued)

*Primary Examiner* — Idowu O Osifade
(74) *Attorney, Agent, or Firm* — Baker & McKenzie LLP

(57) ABSTRACT

Media content relevant to an input video is identified by analyzing video frames in the input video to detect if any of the video frames contain a target product. One or more video frames found to be containing a detected target product is selected and a product thumbnail is generated for each of selected the video frames. At least one product thumbnails is selected and a video product visual index is generated for each of the selected product thumbnail. Relevant media content is then identified for each of the product thumbnails by comparing the video product visual index of each of the selected product thumbnail with a plurality of media content visual index in a media content database. Each media content visual index is associated with one media content in the media content product database.

28 Claims, 9 Drawing Sheets

(51) Int. Cl.

| | |
|---|---|
| ***H04N 21/8547*** | (2011.01) |
| ***H04N 21/44*** | (2011.01) |
| ***H04N 21/81*** | (2011.01) |
| ***G06K 9/62*** | (2006.01) |

(52) U.S. Cl.
CPC ....... *H04N 21/812* (2013.01); *H04N 21/8153* (2013.01); *H04N 21/84* (2013.01); *H04N 21/8547* (2013.01)

(56) References Cited

U.S. PATENT DOCUMENTS

2008/0115161 A1* 5/2008 Kurzion ................. G06Q 30/02 725/32
2010/0186041 A1 7/2010 Chu et al.
2013/0173361 A1 7/2013 Son et al.
2013/0227607 A1* 8/2013 Saltonstall ........... H04N 21/458 725/35
2016/0042251 A1* 2/2016 Cordova-Diba .......... G06T 5/00 382/180
2017/0213243 A1* 7/2017 Dollard .............. G06Q 30/0249

FOREIGN PATENT DOCUMENTS

| | | | |
|---|---|---|---|
| CN | 104137553 | A | 11/2014 |
| JP | H07321748 | A | 12/1995 |
| JP | 2004200932 | A | 7/2004 |
| JP | 2010526497 | A | 7/2010 |
| WO | 2013089146 | A1 | 6/2013 |

OTHER PUBLICATIONS

Written opinion of the international preliminary examining authority for co-pending PCT application No. PCT/SG2015/000053 dated Jul. 26, 2016.

Li, G. et al., “In-Video Product Annotation with Web Information Mining”, ACM Transactions on Multimedia Computing, Communications and Applications, vol. 1, No. 1, Article 1, Jan. 2012, pp. 1-19.

Sivic, J. et al., “Video Google: A Text Retrieval Approach to Object Matching in Videos”, Proceedings of the Ninth IEEE International Conference on Computer Vision, Oct. 13-16, 2003, vol. 2, ISBN 0-7695-1950-4, pp. 1470-1477.

Lowe, D. G., “Object Recognition from Local Scale-Invariant Features”, Proceedings of the Seventh IEEE International Conference on Computer Vision, Corfu, Sep. 20-27, 1999, vol. 2, ISBN 0-7695-0164-8, pp. 1150-1157.

Lowe, D. G., “Distinctive Image Features from Scale-Invariant Keypoints”, International Journal of Computer Vision, Springer-Link, Nov. 2004, vol. 60, Issue 2, pp. 91-110.

Examination Report dated Apr. 26, 2017 in connection with British Application No. GB1703652.6, 2 pages.

Office Action dated Jul. 24, 2018 in connection with Japanese Application No. 2017-225573, 19 pages.

First Office Action dated May 15, 2017 in connection with Japanese Application No. 2016-574896, 7 pages.

Office Action dated Aug. 7, 2019 in connection with Chinese Application No. 201580076927.6, 6 pages.

Office Action dated May 4, 2018 in connection with British Application No. GB1718283.3, 2 pages.

* cited by examiner

METHOD AND SYSTEM FOR IDENTIFYING RELEVANT MEDIA CONTENT

TECHNICAL FIELD

This invention relates generally to a method and system for identifying relevant media content and more specifically identification based on the visual content of a video.

BACKGROUND

Advertising plays an important role for providers of video content. For example, in the case of video streaming websites such as YouTube™ and Hulu™, video content is often streamed to at least some of their users free of charge. A large portion of the content providers' revenue is therefore derived from advertising. Even in the case where video content is not provided free of charge, advertising revenue may also help to subsidize the cost of providing and hosting video content thus keeping subscription charges low. Users of video streaming websites often have the option of closing an advertisement being displayed and therefore the ability to display advertising which would interest a viewer is important to video content providers as it impacts their ability to attract advertisers and hence their revenue.

Currently known methods of identifying advertisements for display during video play is based on criterion such as user profile or behaviour, and metadata of a video such as title and genre. However, such methods of matching may not identify advertisements which will be of interest to a user. Similarly, in other situations such as in the educational context, it may also be desirable to identify relevant media content that would be of interest to a viewer.

SUMMARY

In general terms, the present invention provides a method and system for identifying media content based on visual similarities between objects shown in a video and visual images associated with a media content such as advertisements. This mechanism of matching relevant media content to a video advantageously provides media content that will be of interest to a user due to its visual similarities with objects the viewer sees in the video. By contrast, currently known methods do not identify media content based on the visual content of videos and as a result may miss relevant advertisements that will be of interest to a user.

According to one aspect of the invention, there is provided a method for identifying relevant media content for a input video comprising a plurality of video frames. The method comprises analyzing at least one of the plurality of video frames to detect if any of the plurality of video frames contains a target product, selecting at least one video frame containing a detected target product, and generating a product thumbnail comprising the detected target product for each of the selected video frame. At least one of the product thumbnails is selected and a video product visual index is generated for each of the selected product thumbnail. The method further comprises identifying relevant media content from a media content database for at least one of the selected product thumbnails by comparing the video product visual index of each of the selected product thumbnail with a plurality of media content visual index in the media content database, each media content visual index being associated with one media content in the media content product database.

According to various embodiments, the method may further include correlating at least one media content with the selected product thumbnail based on the comparison.

According to various embodiments, the method may further include generating a video product index comprising at least one video product metadata, each of the video product metadata being associated with one of the selected product thumbnail.

According to various embodiments, each of the video product metadata may include at least one media content correlated with the selected product thumbnail, the at least one media content retrievable to be displayed on a video display.

According to various embodiments, the method may further include computing a product relevance score for each of the selected product thumbnail, wherein the product relevance score indicates the degree of relevance between each of the media content correlated with the selected product thumbnail and the detected target product comprised in the product thumbnail.

According to various embodiments, the step of generating a video product index comprising at least one video product metadata may include choosing which of the plurality of the selected product thumbnails to generate the at least one product metadata based on the product relevance score of the selected product thumbnails.

According to various embodiments, each of the video product metadata may further include the product relevance score of the selected product thumbnail.

According to various embodiments, each of the video product metadata may further include time tag information associated with the selected product thumbnail wherein the time tag information indicates the time location within the input video of the video frame from which the selected product thumbnail was extracted.

According to various embodiments, each of the video product metadata may further include a visual image of the selected product thumbnail, the visual image being retrievable to be displayed on a video display.

According to various embodiments, analyzing at least one of the plurality of video frames to detect if any of the plurality of video frames contains a target product may include using a visual analysis algorithm comprising a whole image visual classification algorithm and an object localization algorithm.

According to various embodiments, the method may further include generating a video product index comprising at least one video product metadata, each of the video product metadata being associated with one of the selected product thumbnail and comprising the video product visual index of the selected product thumbnail associated with the video product metadata.

According to various embodiments, the step of identifying relevant media content for at least one of the selected product thumbnails may be performed after generating the video product index and the identifying may be using the video product visual index in the video product metadata associated with the selected product thumbnail.

According to various embodiments, the method may further include correlating at least one media content with the selected product thumbnail after the step of identifying relevant media content.

According to various embodiments, the method may further include computing a product relevance score for each of the selected product thumbnail associated with one of the video product metadata, wherein the product relevance score indicates the degree of relevance of between the each media content correlated with the selected product thumbnail and the detected target product in the selected product thumbnail.

According to various embodiments each of the video product metadata may further include time tag information associated with the selected product thumbnail associated with the video product metadata wherein the time tag information indicates the time location within the input video of the video frame from which the selected product thumbnail was extracted.

According to various embodiments, the media content may be in the form of advertisements.

In another aspect of the invention, there is provided a system for identifying relevant media content for an input video comprising a plurality of video frames, the system comprising at least one processor configured for performing the steps of: analyzing at least one of the plurality of video frames to detect if any of the plurality of video frames contains a target product; selecting at least one video frame containing a detected target product; generating for each of the selected video frame a product thumbnail comprising the detected target product; selecting at least one of the product thumbnails and generating a video product visual index for each of the selected product thumbnail; and identifying relevant media content from a media content database for at least one of the selected product thumbnails comprising: comparing the video product visual index of each of the selected product thumbnail with a plurality of media content visual index in the media content database, each media content visual index being associated with one media content in the media content product database.

In yet another aspect of the invention, there is provided a system for identifying relevant media content for an input video comprising a plurality of video frames, the system comprising an media content database comprising a plurality of media content and a plurality of media content visual index each associated with one of the media content. The system also comprises a video product index database comprising a plurality of video product index each associated with one of a plurality of input videos, wherein each of the video product index comprises at least one video product metadata, each of the video product metadata comprising a video product visual index of a product thumbnail, the product thumbnail representing a detected target product found in the input video. There is also a product-media content search server configured to identify relevant media content for one of the input video in the video database by: comparing the video product visual index in each of the at least one video product metadata in the video product index of the input video being matched with a plurality of media content visual index in the media content database. This system advantageously provides for the identification of relevant media content for an input video after a user has requested for the input video to be played.

According to various embodiments, the product-media content search server may be further configured to correlate at least one media content with each of the video product visual index based on the comparison.

According to various embodiments, the product-media content search server may be further configured to send the correlated media content to a media content module communicatively coupled to a video player, the advert module being configured to cause the display of the correlated media content on a video display.

According to various embodiments, the media content module may form part of the video player.

According to various embodiments, the input videos are stored in a database located together with the video product index database.

BRIEF DESCRIPTION OF THE FIGURES

The present invention, in accordance with one or more various embodiments, is described in detail with reference to the following figures. These figures as provided for purposes of illustration only intended to facilitate a reader's understanding of the invention. They are not to be construed as limiting the scope or applicability of the invention. Identical reference numerals may be used to indicate like elements appearing in more than one of the figures.

DETAILED DESCRIPTION

In general terms, the present invention provides a method and system for identifying relevant media content, e.g. advertisement based on visual similarities between objects shown in a video and visual images associated with the media content. The identification of the relevant media content may be performed offline before a request to play a video is made or real-time after a request to play the video is made. The embodiments described below illustrate the invention in the context of identifying and displaying advertisements relevant to a video. However, it is to be appreciated that the present invention is not limited to just being applied in the advertising context. For example, the invention may also be used in an educational context where media content such as visual images or videos are shown to educate a child viewing a video on the names of certain objects appearing in a video. In view of this it is to be appreciated that use of the term Ad in the modules and attributes described in the following paragraphs are not meant to be restrictions on the scope of the invention. For example, the following modules may be replaced with modules that contain or process other forms of media content such as pictures and video with an educational purpose. Therefore, the Ad product database may be replaced with a media content database, the Ad storage database may be replaced with a media content storage database, the Ad product visual indexing module may be replaced with a, media content visual indexing module, the product-Ad matching module may be replaced with a product-media content matching module, the product-Ad search server may be replaced with a Product-media content search server and advert module may be replaced with a media content module. The attribute Ad product visual index may also be referred to as media content visual index. Furthermore, it is to be appreciated that in the below description numerous details have been set forth to provide a more thorough explanation of the different embodiments. These details are not intended to be limiting and the invention may be practiced without these specific details.

Figure 1:
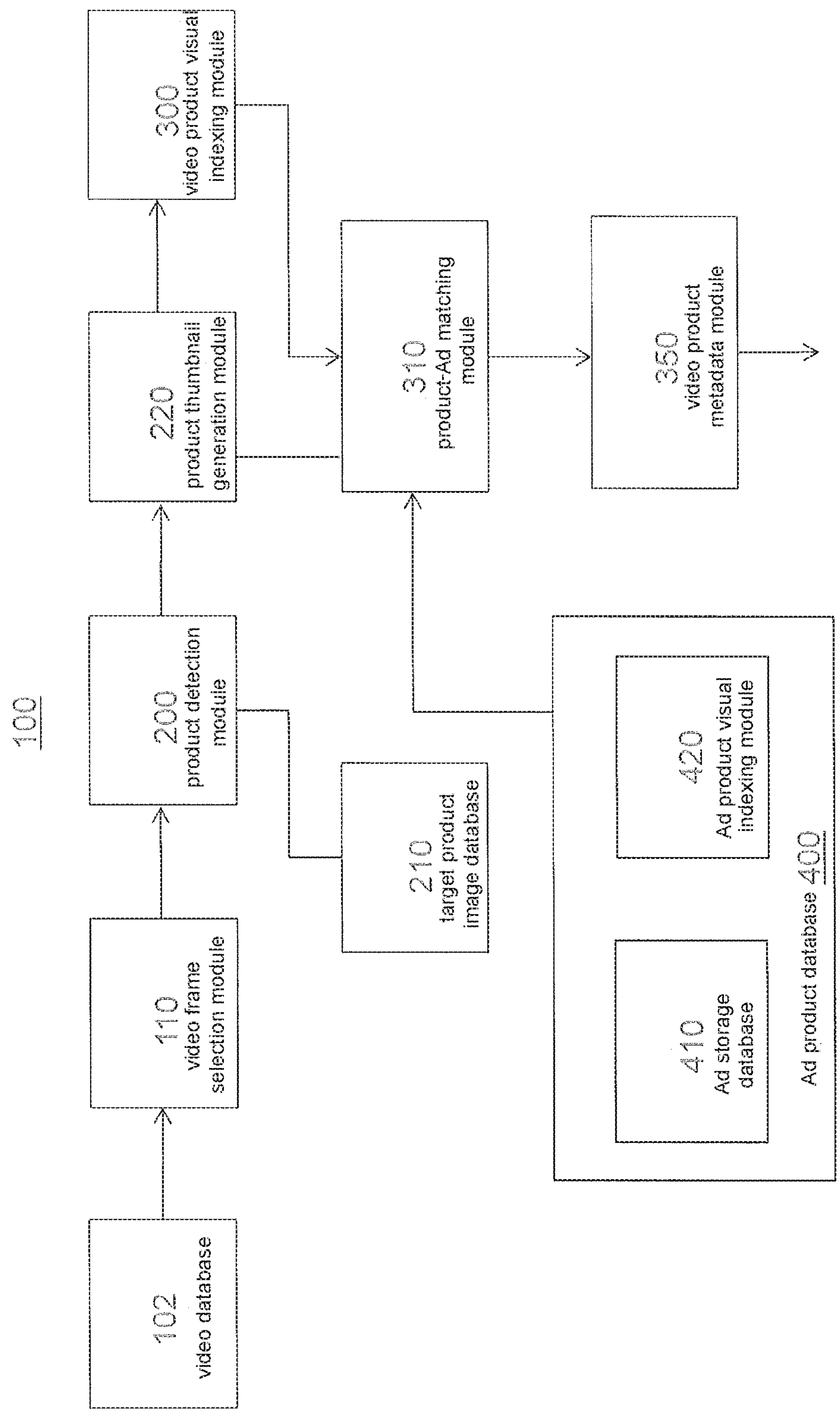
FIG. 1 is a block diagram illustrating an exemplary arrangement for off-line identification of relevant advertisements.

FIG. 1 is a block diagram of an arrangement 100 for off-line identification of relevant advertisements in accordance with one embodiment of the invention. The arrangement 100 comprises a video database 102, video frame selection module 110, a product detection module 200 which is in communication with a target product image database 210, a product thumbnail generation module 220, a video product visual indexing module 300, a product-Ad matching module 310, a video product metadata module 350 and an Ad product database 400. An input video for processing is fed from the video database 102 to the video frame selection module 110 which segments the input video into a plurality of shots each comprising multiple frames and filters off video frames with poor image resolution. The product detection module 200 then analyses incoming video frames from the video frame selection module 110 and identifies which frames contain target products as identified by the target product image database 210. Target products refer to objects related to media content which in this exemplary illustration are advertisements stored in the Ad product database 400. For example, it may include any consumer article which an advertiser would like to advertise such as bags, mobile phones, cup noodles and cars. However, the target products are not limited to articles and may be in the form of identifying characteristics such as a brand logo e.g. BMW™. The target product may also be an object which is related to a product or service which an advertiser wishes to advertise. For example, the target product may be the shape of a hotel building and the service being advertised are hotel booking services. The target product images database 210 contains visual representations of the target products and each target product has a target product name associated with it. At least one video frame identified as containing a target product is selected and the product thumbnail generation module 220 generates a product thumbnail of the target product detected within the frame. The video product visual indexing module 300 then generates a product visual index for each incoming product thumbnail from the product thumbnail generation module by using a visual analysis algorithm to extract a visual representation of the detected target product in the thumbnail. The product-Ad visual matching module 310 identifies advertisements drawn to products visually similar to the detected target product in the product thumbnails by comparing the video product visual index of a product thumbnail with visual representations of advertisements also known as Ad product visual index residing in the Ad storage database 410. At least one relevant advertisement may be correlated with each product thumbnail based on the comparison. Finally, the video product metadata module 350 generates a video product index which is configured to facilitate the display of relevant advertisements during video play. The video product index comprises one or more video product metadata each associated with a product thumbnail. Each video product metadata comprises the at least one relevant advertisement correlated with its associated thumbnail. Time tag information indicating the time location of the frame where the product thumbnail was extracted may also be contained in the video product metadata.

Figure 2:
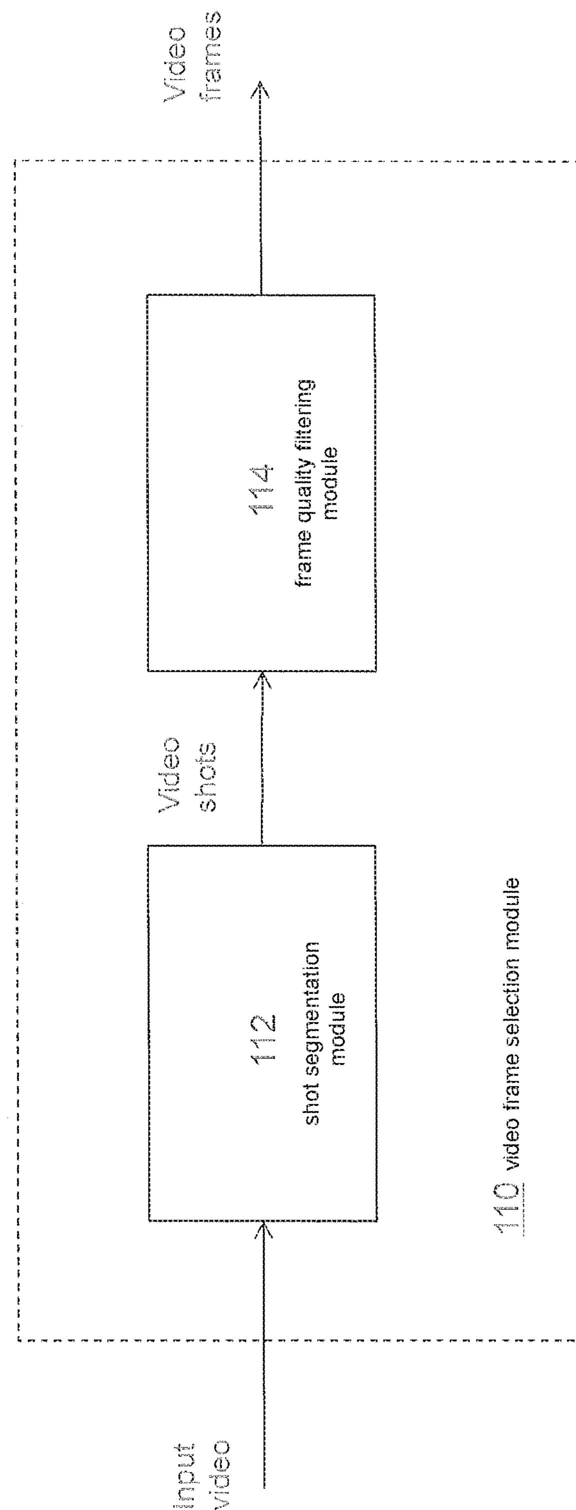
FIG. 2 is a diagram illustrating an exemplary modular overview of the operations performed by a video frame selection module in accordance with the embodiment of FIG. 1.

FIG. 2 illustrates a video frame selection module 110 in accordance with one embodiment of the invention. The frame selection module 110 comprises a shot segmentation module 112 and a frame quality filtering module 114. An input video from the video database 102 is fed into the shot segmentation module 212 which segments the input video into a plurality of video shots each comprising multiple frames. Each video shot typically lasts a few seconds. Preferably, the input video is segmented such that there are no major scene changes within a shot. In one embodiment, an input video is segmented into shots based on the change in visual pixels between consecutive frames. The pixel-by-pixel and colour histogram difference between consecutive frames are calculated and if the difference exceeds a predetermined threshold, the frames are separated into two separate shots. The segmented video is then fed into the frame quality filtering module 114 which filters away frames with poor image resolution before the product detection module 200 analyses video frames in the input video for the presence of target products. Filtering of video frames by the frame quality filtering module 114 involves assessing the image sharpness and contrast of frames in the input video and discarding the frames which do not meet a minimum resolution threshold requirement (for example, due to motion blurriness or scene transitions). Alternatively, it may be possible to omit the frame quality filtering step altogether and proceed straight to the detection of target products. The segmentation of the input video may also be optional.

Frames from the input video are then fed from the video frame selection module 110 into the product detection module 200 which analyses incoming video frames to determine if they contain any target products. The product detection module 200 first generates a visual representation of each frame by extracting visual features from the frame and quantizing the extracted features to create a visual representation of the frame. The visual features may include colour histograms and histograms of oriented gradient and convolutional neural network. Other visual features may also be used additionally or alternatively. In order to assess if a frame contains any target products, the visual representation of the frame is compared with the visual representations of target products contained in the target product image database 210. Visual representations of target products may be created by extracting visual features from at least one exemplary image of a target product and quantizing the extracted features like with the video frames. More than one exemplary image of a target product (e.g. in different views such as frontal, perspective view) as well as images of related products may be used to model a target product and create a visual representation thereof.

The product detection module 200 may use a visual analysis algorithm comprising a whole image visual classification algorithm and an object localization algorithm to analyse the video frames. Alternatively, other visual analysis algorithms may also be suitable. The whole image visual classification algorithm searches the visual representation of a frame to determine if it contains any visual characteristics which resemble the visual representations of target products found in the target product images database 210. A target product probability measure which is indicative of the probability of any target products existing within a frame may be computed. Only frames that have a sufficiently high probability of containing a target product as determined by whether they meet a minimum product probability measure threshold value are selected for further processing by the product thumbnail generation module 220. In one embodiment, upon detecting the presence of a target product, the object localization algorithm locates the detected target product within a frame and generates a location vector indicating the co-ordinates of the detected target product within the frame. Shape-based visual models which detect objects based on feature shape may be used to locate a detected target product. Examples of such algorithms include but are not limited to Haar Cascade Detector and HOG Detector. Alternatively, other object detection algorithms may also be suitable. The location vector may be used subsequently by the product thumbnail generation module 220 to locate a detected target product before generating a product thumbnail containing the detected target product. As mentioned earlier, each target product has a target product name associated with it.

Figure 3:
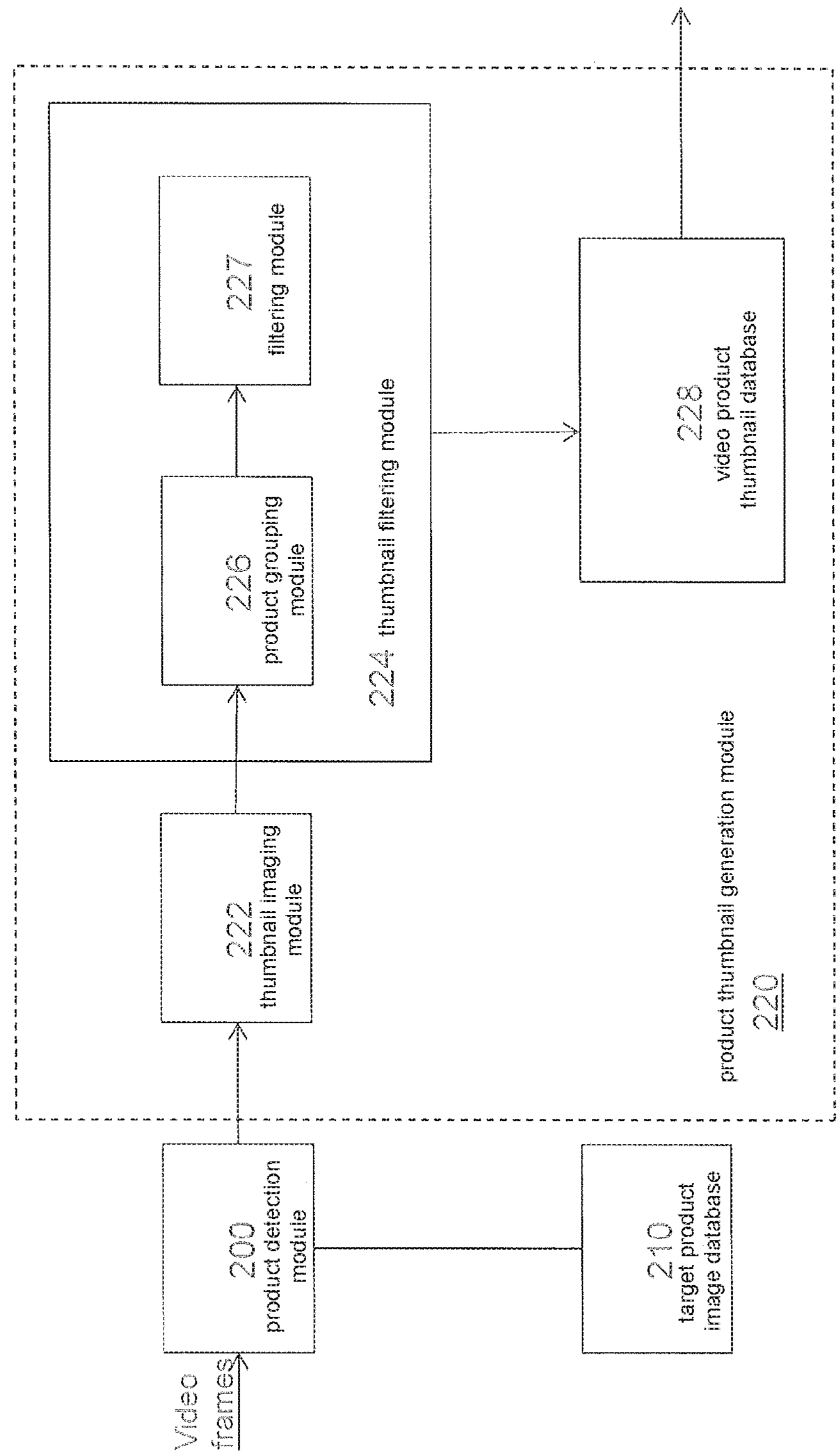
FIG. 3 is a diagram illustrating an exemplary modular overview of the operations performed by a product thumbnail generation module in accordance with the embodiment of FIG. 1.

Video frames selected by the product detection module 200 are then fed into a product thumbnail generation module 220 preferably together with the target product names of the detected target products found in the selected video frames. As shown in FIG. 3, the product thumbnail generation module 220 comprises a thumbnail imaging module 222, a thumbnail filtering module 224 and a video product thumbnail database 228. The thumbnail imaging module 222 locates a detected target product within an incoming video frame and generates a thumbnail image of the detected product based on the localized image of the detected target product. We shall refer to the thumbnail image as a product thumbnail. The location of target products within a frame may be assisted by the location vector which indicates the co-ordinates of a detected target product within a video frame. In an alternative embodiment, the thumbnail imaging module 222 generates a thumbnail of a target product based on the visual image of an entire frame instead of first locating the detected target product and generating a product thumbnail based on the localised area around the product itself. An advantage of locating target products within a frame and zooming in on the detected target product itself before creating a product thumbnail is that background noise from other features within the frame are substantially eliminated. This allows for a more accurate visual representation of the detected target product and accordingly improves identification of advertisements relevant to the detected target product.

Product thumbnails generated by the product thumbnail imaging module 222 are fed into the thumbnail filtering module 224 which may comprise a product grouping module 226 and/or a filtering module 227. The product grouping module 226 assesses the product thumbnails and groups them if necessary. The thumbnails may then be filtered by the filtering module 227. In one embodiment, the product grouping module 226 determines if two or more product thumbnails within the same shot contain the same target product as indicated by similarities in the detected target product such as product visual features and location within a frame. If two or more product thumbnails are found to contain the same target product, they are grouped together. The filtering module 227 then filters the product thumbnails in a two step process. In the first step, the product thumbnails are filtered based on criterion such as image quality and size of each thumbnail group. Image quality may be assessed in terms of image resolution, and contrast. A thumbnail group with a larger group size may be considered as more desirable because this means that the same target product appears for a longer duration within a shot and as such the target product is more likely to have been accurately identified compared to a product which appears only once. The filtering mechanism may be weighted in order to allocated different priority to each criteria. If an individual product thumbnail (that is not part of a group) or if all members of the same group do not meet the filtering criterion, they are discarded. In the second step, if the remaining product thumbnails contains one or more groups, the filtering module selects one product thumbnail to represent each group and deletes the remaining thumbnails in the group. Criterion useful in selecting a representative product thumbnail include those used frame quality filtering such as image resolution, contrast and target product probability measure. Other criterion which are more product specific such as product probability measure and thumbnail image resolution may also be used additionally or alternatively. Product thumbnails that are retained by the filtering module 227 are saved to the video product thumbnail database 228. The target product name of the detected target product in the product thumbnails and time tag information associated with the product thumbnails may also be saved in the video product thumbnail database together with the product thumbnails. Time tag information indicates the time location within an input video of the video frame where the thumbnail was extracted.

As illustrated in FIG. 1, video product thumbnails stored in the video product thumbnail database 228 of the product thumbnail generation module 220 are input into the video product visual indexing module 300 which generates a visual representation of the detected target product in each product thumbnail. We shall refer to this visual representation as video product visual index. The video product visual index is generated by extracting visual features in the product thumbnail and quantising the extracted features to create a visual representation of the detected target product. The visual features may include colour histograms and histograms of oriented gradient and convolutional neural network. Other visual features may also be used additionally or alternatively. The video product visual index of a product thumbnail is then input into the product-Ad matching module 310 which uses it to identify media content which in this case are advertisements drawn to products that are visually similar to the detected target product in the thumbnail.

As shown in FIG. 1, the product-Ad matching module 310 is in communication with the Ad product database 400 which comprises an Ad storage database 410 and an Ad product visual indexing module 420. The Ad storage database 410 stores advertisements which may be in the form of visual images or videos. For example, in the case of videos, at least one visual image representing the products being advertised is stored alongside the video. The Ad product visual indexing module 420 generates a visual representation of the product being advertised by each advertisement. The visual representation which we shall refer to as the Ad product visual index could be based on the advertisement itself if the advertisement takes the form of a visual image. The Ad product image could also be based on one or more visual images of the product being advertised in an advertisement. As with the video product visual index, the Ad product visual index is also generated by using a visual analysis algorithm to extract visual features in the visual image. The visual features may include colour histograms and histograms of oriented gradient and convolutional neural network. Other visual features may also be used additionally or alternatively. The Ad product visual index is stored in the Ad storage database as part of the Ad product index of its associated advertisement. The advertisements in the Ad storage database are preferably also assigned target product names corresponding to the target product names for target products stored in the target product image database. The target product name associated with an advertisement may be stored in the Ad product index.

The product-Ad matching module 310 identifies advertisement relevant to a detected target product in each video product thumbnail by searching the Ad storage database 410 for advertisements tied to products which are visually similar to the detected target product. Visual similarities are measured by determining a closeness of match between the video product visual index of a product thumbnail and the Ad product visual index of an advertisement. As discussed above, the Ad product visual index of an advertisement is a visual representation of the product being advertised in an advertisement. The search for relevant advertisements may be assisted by restricting the search to advertisements which have the same target product name as the detected target product. The product-Ad visual matching module 310 may compute a product relevance score for each thumbnail based on the search results. The product relevance score indicates the degree of similarity between at least the most closely matched advertisement on the Ad storage database and a detected target product in terms of their respective product visual index. The number of advertisements included in the product relevance score corresponds to the number of relevant advertisements correlated with a thumbnail. The number of correlated advertisements in turn depends on the desired number of advertisements which may be displayed concurrently on a video display such as a graphical user interface (GUI). Accordingly, the product relevance score is not just limited to information on the most closely matched advertisement but the top few most relevant advertisements. In one embodiment, a product thumbnail may be discarded and not fed into the video product metadata module 350 if the degree of similarity between the most closely matched advertisement and a detected target product in the thumbnail as indicated in the product relevance score does not meet a minimum threshold value.

The video product metadata module 350 creates a video product metadata for each product thumbnail that has not been discarded by the product-Ad matching module 310. Advertisements correlated with the product thumbnails as well as other information regarding the product thumbnails are input into the video product metadata module 350 in order to enable the creation of video product metadata. Each video product metadata contains the at least one advertisement correlated with the product thumbnail. It may also contain attributes associated with the product thumbnail including time tag information on the time location of the frame where the product thumbnail was extracted. Other attributes such as product relevance score, an image of the product thumbnail may also be included in the video product metadata. It is to be appreciated that it is not essential to include the time tag information, product thumbnail image and product relevance score. However, the product thumbnail image required if the image is to be displayed when an input vided is played while the product relevance score is necessary if it is intended that advertisements are selectively displayed depending on product relevance score. The video product metadata for each thumbnail may be stored in a buffer located in the video product metadata module 350 for subsequent retrieval by the video product metadata module 350. In order to enable the display of relevant advertisements when the input video is played, the video product metadata module 350 generates a video product index comprising all the video product metadata associated with an input video. The video product index may be in the form of a data packet and is configured such that correlated advertisements in the video product metadata can be retrieved for display on a video display.

Figure 4:
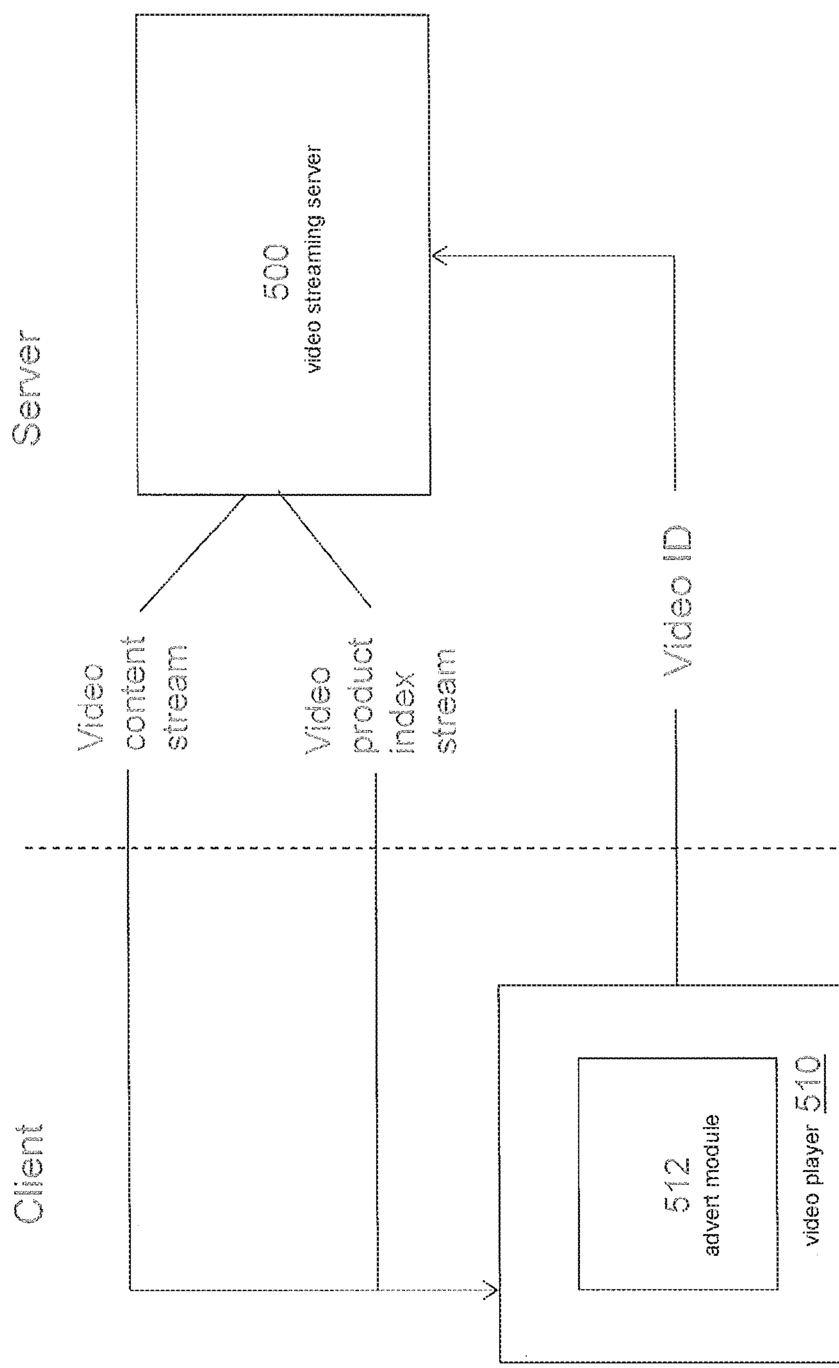
FIG. 4 is a schematic diagram illustrating an exemplary computing environment in which a video product index generated by the embodiment of FIG. 1 may be delivered.
Figure 5:
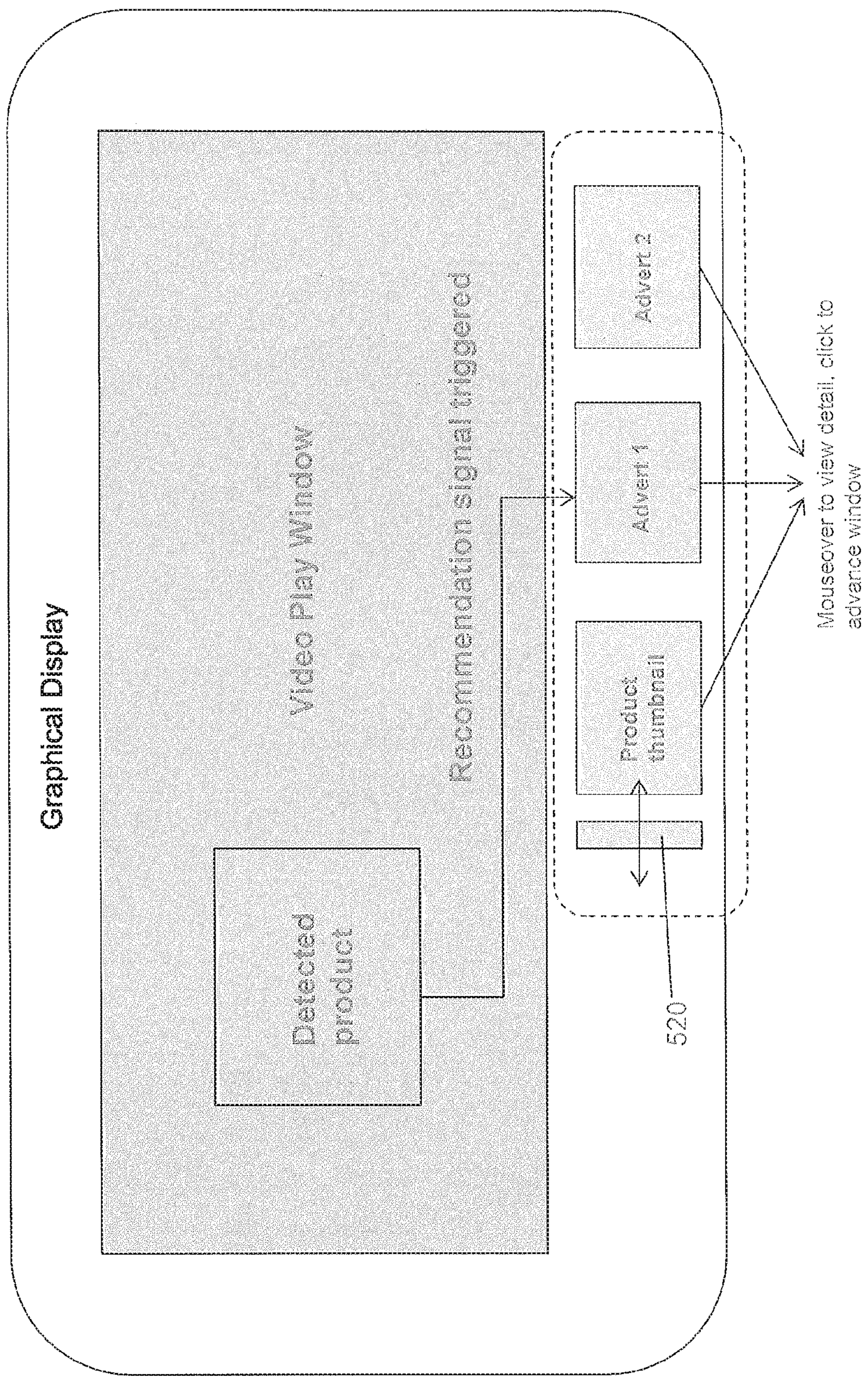
FIG. 5 is an exemplary video player graphical user interface illustrating display of relevant advertisements during video play in accordance with one embodiment of the invention.

In one embodiment shown in FIG. 4, the input video and its associated video product index is saved on a video streaming server 500 hosted remotely from a video player 510 located at a client. The video streaming server is in communication with the video player via a network such as the internet. The video player 510 comprises a advert module 512 which is configured to read the video product index and cause the display of relevant advertisements on a video display where the video player displays the video. Although the advert module is illustrated in FIG. 4 as a component of the video player 510, it should be understood that this is not essential and the advert module may also be embodied as a stand-alone module. When a user requests the video player 510 to play a particular video stored on the video streaming server 500, the video player 510 sends a request to the server 500 together with the video ID of the video to be retrieved. In response to receiving the video request, the server streams the video content of the requested video as well its associated video product index to the video player 510. The associated video product index is stored in the advert module 512. The advert module will read the video product index and render the display of correlated advertisements on the video player's graphical user interface (GUI). In one embodiment, the advert module 512 may automatically render the display of correlated advertisements on the video player's GUI anytime when the video is being played such as when the video plays at a time tag. As discussed earlier, the time tag refers to the point in a video where a frame with a detected product appears. The correlated advertisements may also be displayed before or after the input video has been played. Alternatively or additionally, the display of advertisements may also be selective in which case the advert module compares the product relevance score of each advertisement with a specified threshold value and only renders the display of advertisements having a product relevance score exceeding a specified threshold value. The specified threshold value may vary depending on the identity of the user requesting an input video. For example, a video content supplier may have different classes of users such as paying and non-paying users. The advert module may then be configured such that the specified threshold for paying users is higher than that for non-paying users so that a non-paying user generally has more advertisements being displayed. In one embodiment shown in FIG. 5, more than one relevant advertisement is displayed concurrently for example, advertisements with the highest and second highest product relevant score may be displayed. Although the advertisements in FIG. 5 are illustrated as visual images, it is also possible for the advertisements to be in the form of videos. The product thumbnail containing the detected target product may also displayed at the same time as the advertisements. Additionally, the GUI may also be configured such that it is possible to zoom in on advertisement images and product thumbnail images. The GUI may also have a control bar 520 which is movable to view more cr close. It is to be understood that although the video streaming server 500 is illustrated in FIG. 4 as serving only one video player client, the server may also serve multiple clients whose videos and video product index are similarly hosted on the video streaming server. Furthermore, in another off-line embodiment, the input video and its associated video product index may stored together at the client location such as at a storage device located in or coupled to the video player and retrieved without having to connect to a remote server.

Figure 6:
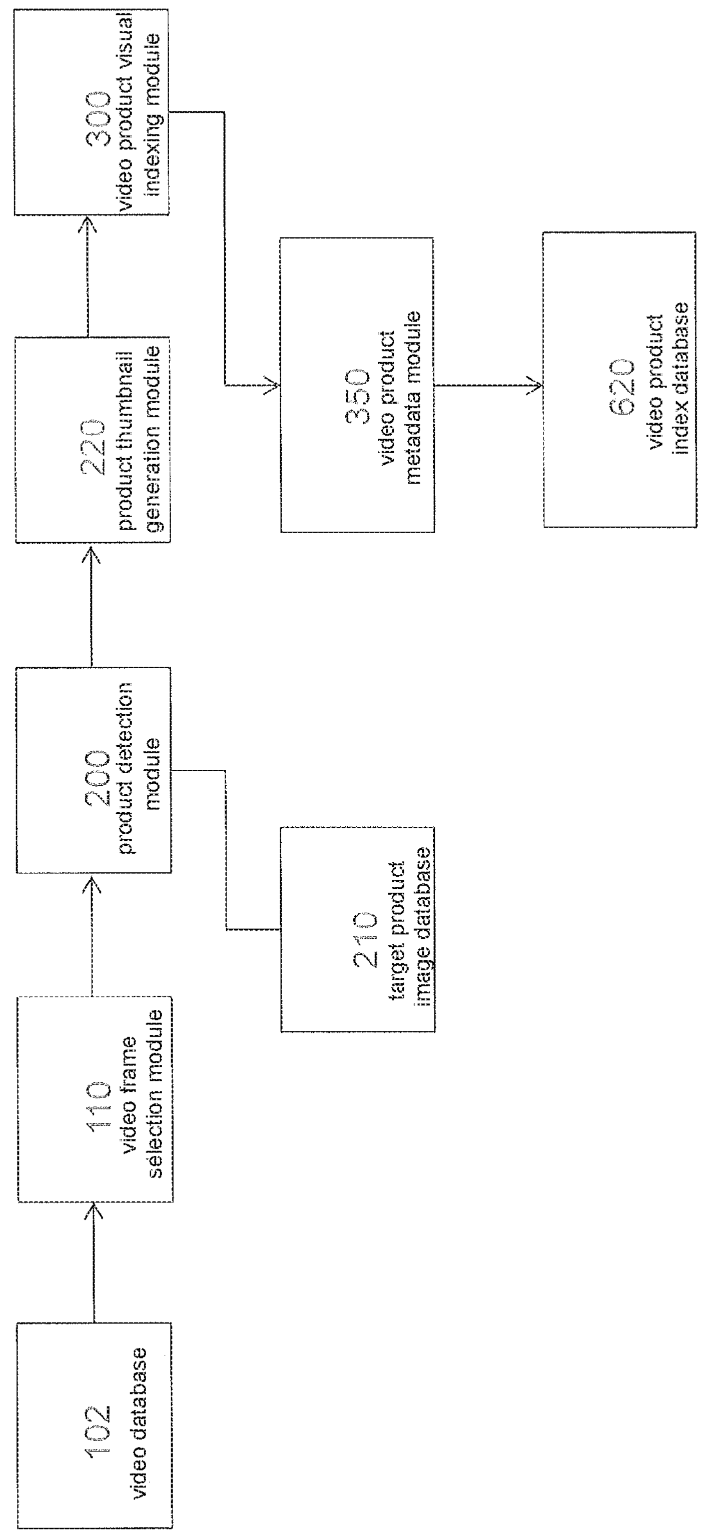
FIG. 6 is a block diagram illustrating an exemplary arrangement for generating a video product index for on-line identification of relevant advertisements.

FIG. 6 shows a block diagram of an exemplary arrangement 600 for the generation of a video product index to be used in the on-line identification of relevant advertisements when a video is played. The arrangement 600 comprises a video database 102, a video frame selection module 110, a product detection module 200 in communication with a target product image database 210, a product thumbnail generation module 220, video product visual indexing module 300, a video product metadata module 350 and a video product index database 620. In one embodiment, the video frame selection module 110, product detection module 200, target product image database 210, product thumbnail generation module 220, video product visual indexing module 300 are similar to those found in the off-line embodiment of FIG. 1. They also operate similarly to identify target products in an input video stream, select one or more frames containing detected target products, generate product thumbnails containing the detected products and generate visual product indexes of detected target products in product thumbnails.

Specifically, an input video for processing is fed from the video database 102 to the video frame selection module 110 which segments the input video into a plurality of shots each comprising multiply frames and filters off video frames with poor image resolution. The video frame selection module 110 described in FIG. 2 may be used. The product detection module 200 then analyses incoming video frames from the video frame selection module 110 and identifies which frames contain target products as identified by the target product image database 210. Target products refer to objects related to advertisements stored in the Ad product database 400 wherein the advertisements are to be matched with the input video for display when the video is played. The product detection module 200 described in relation to FIG. 1 may be used. The detection of target products is performed by comparing a visual representation of each frame with the visual representations of target products in the target product images database 210 using a visual analysis algorithm. The visual analysis algorithm may comprise a whole image visual classification algorithm which searches the visual representation of a frame to determine if it contains any visual characteristics which resemble the visual representations of target products found in the target product images database 210. A target product probability measure indicating the probability of any target products existing within a frame may be computed. In one embodiment, the visual analysis algorithm may further comprise an object localization algorithm which upon the detection of a target product within a frame and generates a location vector indicating the co-ordinates of the detected target product within the frame. Shape-based visual models which detect objects based on feature shape may be used to locate a detected target product. The location vector may be subsequently used by the product thumbnail generation module 220 to locate a detected target product before generating a product thumbnail containing the detected target product. Only frames that meet a pre-set threshold value target value for the product probability measure are selected for further processing by the product thumbnail generation module 220. Video frames selected by the product detection module are then fed into a product thumbnail generation module 220 which generates a thumbnail of a target product detected within a video frame. The product thumbnail generation module 220 described in FIG. 3 may be used. As described in relation to FIG. 3, the product thumbnail generation module 220 comprises a thumbnail imaging module 222, a thumbnail filtering module 224 and a video product thumbnail database 228. The thumbnail imaging module 222 a product thumbnail which is a visual image of a detected target product within a video frame. Preferably, the thumbnail imaging module 222 locates a detected target product within a video frame using the location vector generated by the product detection module 200 and generates a thumbnail image of the product based on the localised image of the detected target product. A product thumbnail may also be generated based on the visual image of the entire frame instead. In instances where more than one target product was detected within a frame, the thumbnail imaging module only generates a product thumbnail of the target product which has the highest likelihood of existence as measured by the target product probability measure. Product thumbnails generated by the product thumbnail imaging module 222 are fed into the thumbnail filtering module 224 which comprises a product grouping module 226 and a filtering module 227. The product grouping module 226 assesses the product thumbnails and groups them if necessary. The filtering module 227 may then filter the product thumbnails in a two step process. In the first step, the product thumbnails are filtered based on criterion such as image quality and size of each thumbnail group. In the second step, if the remaining product thumbnails contains one or more groups, the filtering module selects one product thumbnail to represent each group and deletes the remaining thumbnails in the group. Product thumbnails that are retained by the filtering module 227 are saved to the video product thumbnail database 228 preferably together with the target product name of the detected target product in the thumbnails and time tag information associated with the thumbnails. Time tag information indicates the time location within an input video of the video frame where the thumbnail was extracted. As illustrated in FIG. 6, video product thumbnails stored in the video product thumbnail database 228 of the product thumbnail generation module 220 are input into the video product visual indexing module 300 which generates a visual representation of the detected target product in each thumbnail. The video product visual index is generated by extracting visual features in the thumbnail and quantising the extracted features to create a visual representation of the product.

Figure 7:
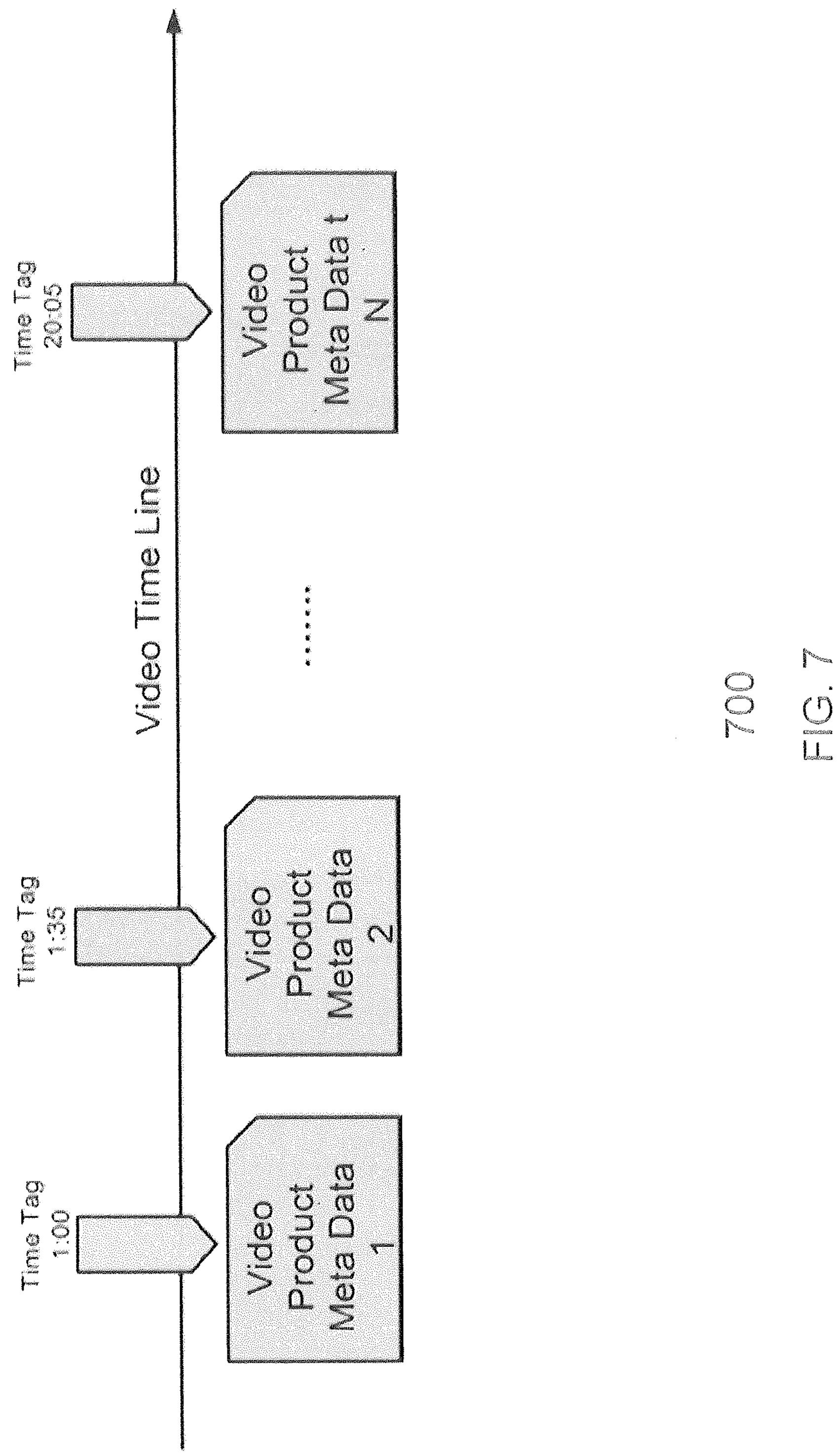
FIG. 7 is an exemplary illustration of a video product index in accordance with one embodiment.

The video product visual index of a product thumbnail is then input into the video product metadata module 350 which creates a video product metadata for each product thumbnail. Each video product metadata contains at least the video product visual index of the product thumbnail it is associated with. It may also optionally include other attributes related to the associated product thumbnail including the target product name, time tag information and image of the product thumbnail. Time tag refers to information on the time location of the frame where the product thumbnail was extracted and is included in the video product metadata if advertisements are to be displayed around the time when a detected target product is appears in a video. As for the product thumbnail image, it is required if an image of the product thumbnail is to be displayed when an input video is played. The video product metadata for each thumbnail may be stored in a buffer located in the video product metadata module 350 for subsequent retrieval by the video product metadata module 350. In order to enable the display of relevant advertisements when the input video is played, the video product metadata module 350 generates a video product index comprising all the video product metadata associated with an input video. The video product index is in the form of a data packet and is configured such that information residing in the video product metadata can be retrieved and used for purposes such as the identification relevant advertisements. FIG. 7 shows an exemplary video product index 700 comprising a plurality if video product metadata 1-N, each associated with a product thumbnail. As discussed earlier, each video product metadata should at least contain information necessary for the identification of advertisements relevant to a detected target product shown in the product thumbnail. The video product index is configured such that information in each video product metadata can be retrieved and used to search for relevant advertisements. The video product index 700 shown in FIG. 7 is time-based such that the information is tied to the time-line of the input video as evidenced by the presence of the time tag information residing in the video product metadata.

Figure 8:
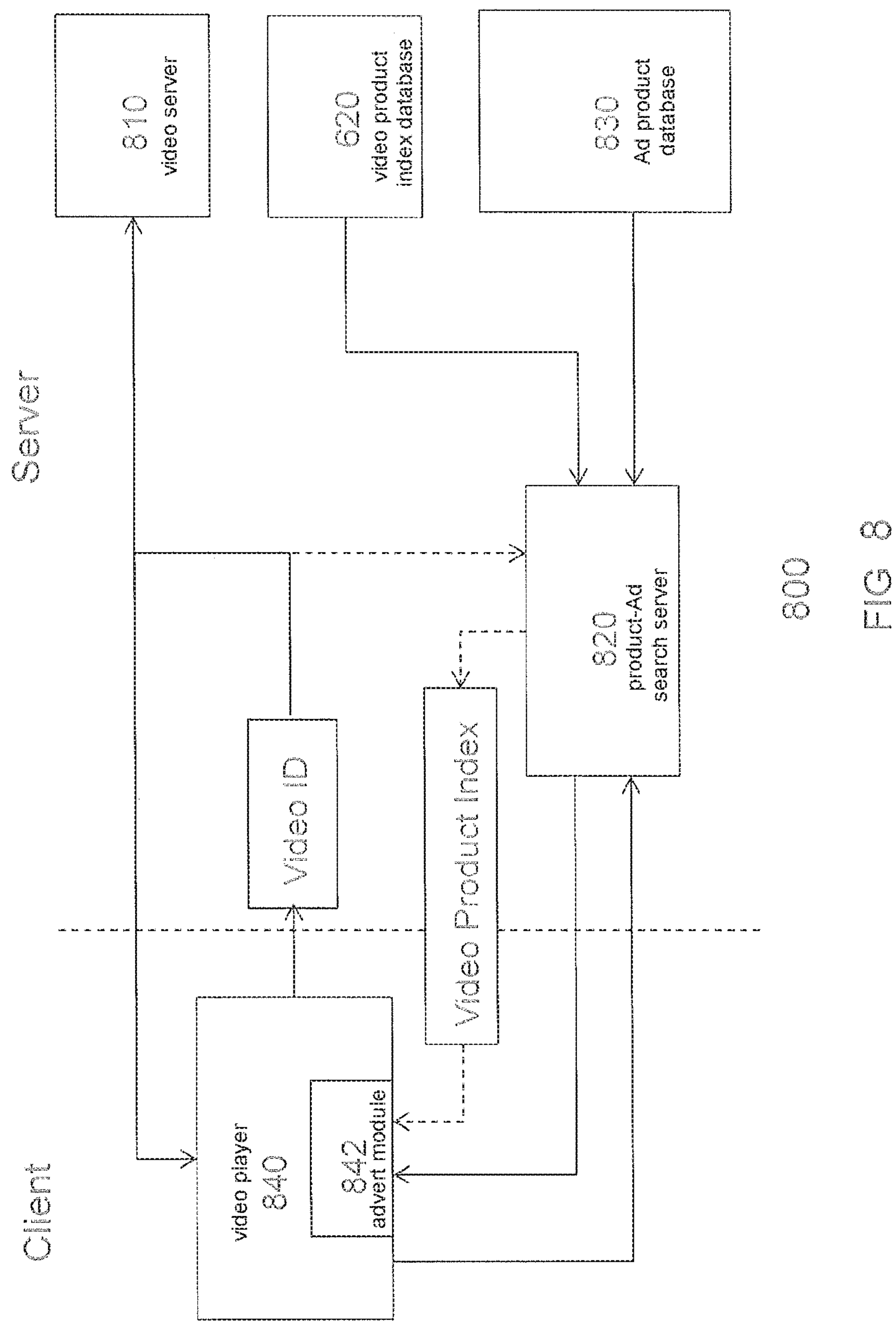
FIG. 8 is a block diagram illustrating an exemplary arrangement for on-line identification of relevant advertisements.

FIG. 8 illustrates an embodiment of a system 800 for online identification of relevant advertisements using a video product index. The system comprises at a server location a video server 810 comprising plurality of videos. The video server may be the same as the video database 102 shown in FIGS. 1 and 6. The server location also includes a product-Ad search server 820 which is coupled to a video product index database 620 and an Ad product database 820 comprising an Ad storage database. The product-Ad search server 820 is in communication via a network such as the internet with a client which includes a video player 840 comprising an advert module 842. The advert module 842 is configured to read a video product index associated with a video and co-ordinate as well as cause the display relevant advertisements when the video is played. The advert module 842 may also be configured to take certain actions in response to user actions. The advert module 842 is illustrated in FIG. 8 as forming part of the video player itself, but it is to be appreciated that the advert module 842 may also a stand alone embodiment in the form of an add-on module.

In response to a user request to play a particular video file, the video player sends a request to the video server 810 to send the requested video file which is identified by a video ID. Upon receipt of the request, the video server 810 sends the video file to the video player. In order to enable the identification of advertisements relevant to the video file, the advert module 842 also sends a request to the product-Ad search server 820 for the video product index corresponding to the requested video. The corresponding video product index is identified by the same video ID as the video itself. Upon receipt of the request, the product-Ad search server 820 retrieves the corresponding video product index from the video product index database 620 using the video ID and sends it to the advert module 842. In another embodiment not illustrated in the figures, the video product index may be stored together with the video file such as in the video server 810 and retrieved together with the video file. The video product index may also be stored together with the video file at a location found on the client side. If the video product index is stored with its associated video file, a separate video product index database may not be required. As described earlier, the video product index contains one or more video product metadata associated with a product thumbnail. Each video product metadata includes at least information which would assist in the identification of advertisement relevant to the detected target product in the thumbnail. Therefore each video product metadata would include at least the video product visual index. It may also include the target product name as this would facilitate the identification of a relevant advertisement. Additionally, time tag indicating the timing of the frame where the product is found and/or a visual image of the product thumbnail may also be included in the video metadata.

In order to identify advertisements relevant to a detected target product found in a product thumbnail, the advert module 842 retrieves the video product visual index of the product thumbnail from its corresponding video product metadata in the video product index. The advert module 842 then sends a recommendation signal to the product-Ad search server 910 requesting it to identify a relevant advertisement based on the video product visual index. The advert module 842 may send recommendation signals anytime after the video product index has been received. In situations where advertisements relevant to a detected target product are to be displayed at the same time the detected target product appears in the video, the recommendation signal for that detected product would have to be triggered before video play reaches the time tag, that is, the time location where the detected target product appears in the video. The advert module 842 may obtain time tag information from the video product metadata contained in the visual product index and co-ordinate the triggering of recommendation signals such that relevant advertisements may be received and displayed in time. Preferably, the target product name associated with the detected product is also found in the video metadata so that it can be retrieved by the advert module 842 and sent to the product-Ad search server so that as described below only advertisements having the same target product name are analyzed. Additionally, the advert module may also send other information not found in the video metadata to assist in the search. It is to be appreciated that the processes of sending recommendation signals, identifying relevant advertisements and sending correlated advertisements may be carried on even while the associated video is being played.

As shown in FIG. 8, the product-Ad search server 820 is in communication with the Ad product database 830 which stores a plurality of advertisements in the form of visual images or videos. Each advertisement has a corresponding Ad product visual index which is a visual representation of the product being advertised by each advertisement. Similar to the embodiment in FIG. 1, an Ad product visual index could be based on the advertisement itself if the advertisement takes the form of a visual image or based on one or more visual images of the product being advertised in an advertisement. The Ad product visual index is generated by extracting visual features in the visual image. The visual features may include colour histograms and histograms of oriented gradient and convolutional neural network. Other visual features may also be used additionally or alternatively. The Ad product database 830 may also include other information regarding the advertisements such as which product category an advertisement belongs to. The product-Ad search server 810 identifies advertisement relevant to a detected target product by searching the Ad storage database 830 for advertisements drawn to products which are visually similar to the detected target product. Visual similarity is measured by closeness of match between the video product visual index of a product thumbnail and the Ad product visual index of an advertisement. Preferably, advertisements in the Ad storage database are also assigned target product names corresponding to target product names assigned to target products in the target product image database. The search for relevant advertisements would then assisted by searching for advertisements having the same target product name as a detected product being matched. The search for relevant advertisements may also be guided by other additional information sent by the advert module such user information and any text queries which may have been entered by a user when searching for a video to guide the search. The product-Ad search server 820 may compute a product relevance score for each thumbnail based on the search results. The product relevance score indicates the degree of visual similarity between at least the most closely matched advertisement on the Ad product database 830 and a detected target product being matched in terms of their respective product visual index. The number of advertisements included in the product relevance score corresponds to the number of relevant advertisements correlated with a product thumbnail. The number of correlated advertisements in turn depends on the desired number of advertisements which may be displayed concurrently on a video player GUI. Accordingly, the product relevance score is not just limited to information on the most closely matched advertisement but the top few most relevant advertisements.

The product-Ad search server 820 retrieves correlated advertisements from the Ad product database 830 and sends them to the advert module 842. The advert module 842 may store the correlated advertisements in a buffer before they are displayed on a video player GUI. In one embodiment, the advert module 842 automatically renders the display of correlated advertisements on the video player's graphical user interface (GUI) when a video is being played. Preferably, the relevant advertisements are displayed when the video plays at a time tag, that is, at the same time as when its corresponding detected target product appears on the video. The product thumbnail may also be displayed along side the advertisements like in FIG. 5. However, this is not essential. For example, relevant advertisements may also be displayed before or after the video is played. In another embodiment, the display of correlated advertisements is selective in which case the advert module 842 compares the product relevance score of each correlated advertisement with a specified threshold value and renders only the display of advertisements having a product relevance score exceeding the specified threshold value. The threshold setting may be a variable which changes depending on the identity of the user requesting a video. For example, a paying user may have a higher threshold setting than a non-paying user so that fewer advertisements are displayed. Where the threshold setting is stored on the product-Ad search server, only advertisements with a product relevance score higher than the threshold will be sent to the advert module 842. Additionally, the advert module 842 may also be configured to perform certain actions when the user responds to displayed advertisements.

Figure 9:
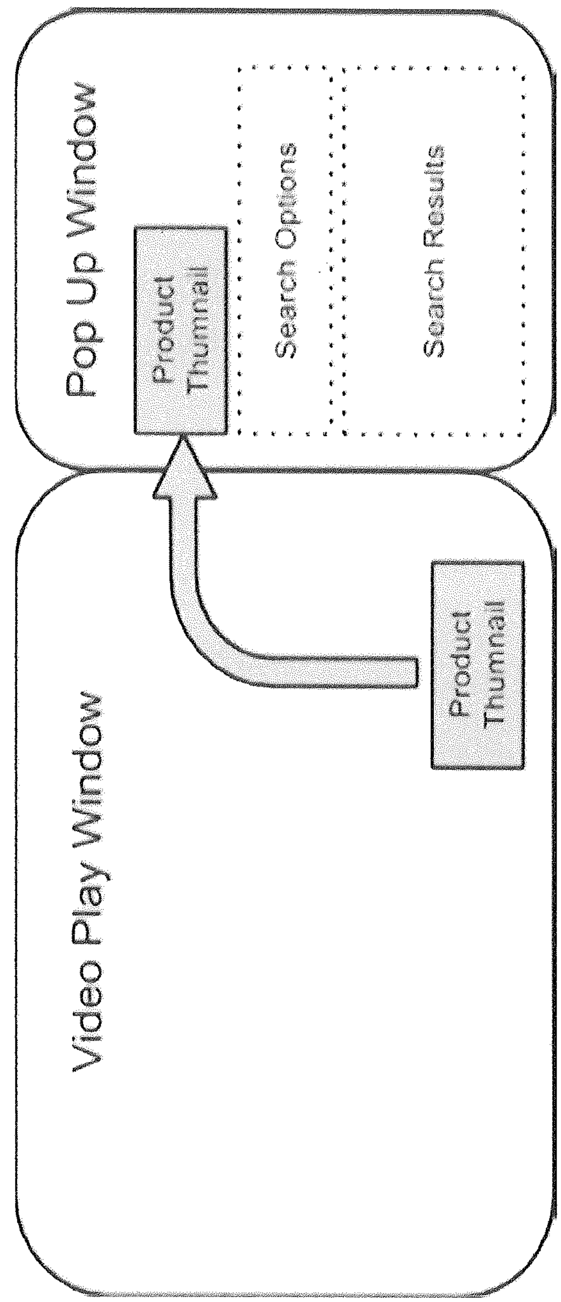
FIG. 9 is an exemplary video player graphical user interface illustrating a display of relevant advertisements in a pop up window during video play.

In another application of the system in FIG. 9, searches for relevant advertisement are not automatically triggered but is based upon user request. In one example illustrated in FIG. 9 product thumbnails of detected products are shown on a video player GUI during video play and a user triggers a search by clicking on the thumbnail. In such instances, the video product metadata found in a video product index would have to include an image of the product thumbnail and time tag information. In response to such user action, the advert module 842 in FIG. 8 triggers a recommendation signal similar to the one automatically triggered when a video plays near a time tag. Upon receipt of a recommendation signal, the product-Ad search server 820 identifies a relevant advertisement for a detected target product found in the thumbnail. In order to facilitate the search for relevant advertisement, the video product visual index of the detected product is retrieved from its video metadata in a video product index associated with the video being played and sent to the product-Ad search server 820. Preferably, the target product name of the detected product may also be retrieved from the video product metadata and sent to the product-Ad search server 820. As with the example where searches are automatically triggered, the product-Ad search server 820 searches the Ad storage database 830 for advertisements of products which are visually similar to the detected target product. Visual similarity being measured by closeness of match between the video product visual index of a detected target product and the Ad product visual index of an advertisement. In one embodiment, the search for relevant advertisements is assisted by searching for advertisements having the same target product name as a detected product that is being matched. Other information may also be transmitted by the advert module 842 to the product-Ad search server 820 to assist in the search. For example, the video player GUI shown in FIG. 9 allows a user to select search options. Search options selected by a user as well as other information such as user behaviour and preference information, text queries which may have been entered by a user when searching for a video may also be sent to the product-Ad search server 820 and used in the identification of relevant advertisements. The product-Ad search server 820 computes a product relevance score which indicates how relevant at least the most closely matched advertisement is to a detected target product being matched. It based primarily based on the degree of visual similarity. The number of relevant advertisements being reflected in the product relevance score depends on the desired number of advertisements that may be displayed concurrently on a video player GUI and hence correlated with each product thumbnail. One or more advertisements with the highest product relevance score is sent by the product-Ad search server 820 to the advert module 842 for display on the video player GUI. In the example of FIG. 9, relevant advertisements are displayed in a pop up window alongside the product thumbnail and search options.

The invention claimed is:

1. A method of transforming information provided by a computing device into computer-implementable instructions, the method comprising:

establishing, between a processor and the computing device, a communication channel;

receiving, by the processor from the computing device, information, including at least an input video having a plurality of video frames;

segmenting, by the processor, the input video into a plurality of shots, each shot containing multiple video frames;

analyzing, by the processor, the multiple video frames in each shot to detect if any of the multiple video frames contains a target product;

selecting, by the processor, based on the analyzing of the multiple video frames, only video frames that have been detected by the processor to contain a detected target product;

generating, by the processor for each selected video frame that contain the detected target product, a product thumbnail, the product thumbnail being an image having a visual representation of the detected target product generated based on an image of the detected target product identified, by the processor, within the selected video frame;

detecting, by the processor, whether two or more product thumbnails within the same shot contain the same detected target product;

grouping, by the processor, the product thumbnails which contain the same detected target product derived from the same shot into respective groups;

selecting, by the processor, at least one of the product thumbnails and generating, by the processor, a video product visual index for each of the selected product thumbnails, wherein the selecting at least one of the product thumbnails comprises selecting one of the product thumbnails from at least one of the groups to represent the detected target product found in the group, and wherein the video product visual index for each selected product thumbnail is a visual representation generated based on one or more visual features of the detected target product identified, by the processor, within the selected product thumbnail; and identifying, by the processor, relevant media content from a media content database for at least one of the selected product thumbnails, the identifying comprising comparing the video product visual index of each of the selected product thumbnail with a plurality of media content visual index in the media content database, each media content visual index being associated with one media content in the media content database.

2. The method of claim 1 wherein one or more of the following apply:

the detecting whether two or more product thumbnails within the same shot contain the same detected target product comprises analyzing whether the detected target products are the same by comparing similarities in one or more of the following: product visual features or location of the detected target product within the selected video frame; and/or the selecting one of the product thumbnails from at least one of the groups to represent the detected target product found in the group comprises selecting based on image quality of the product thumbnail.

3. The method of claim 1, further comprising one or more of the following:

filtering out some of the product thumbnails before selecting at least one of the product thumbnails; and/or correlating at least one media content with the selected product thumbnail based on the comparison.

4. The method of claim 3 wherein the some of the product thumbnails are filtered out based on one or more of the following:

size of the group associated with the product thumbnail; and/or image quality of the product thumbnail.

5. The method of claim 1, further comprising generating a video product index comprising at least one video product metadata, each of the video product metadata being associated with one of the selected product thumbnail.

6. The method of claim 5 wherein each of the video product metadata comprises at least one media content correlated with the selected product thumbnail, the at least one media content retrievable to be displayed on a video display.

7. The method of claim 6 further comprising computing a product relevance score for each of the selected product thumbnail, wherein the product relevance score indicates the degree of relevance between each of the media content correlated with the selected product thumbnail and the detected target product comprised in the product thumbnail.

8. The method of claim 7 wherein one or more of the following apply:

the step of generating a video product index comprising at least one video product metadata comprises choosing which of the plurality of the selected product thumbnails to generate the at least one product metadata based on the product relevance score of the selected product thumbnails; and/or each of the video product metadata further comprises the product relevance score of the selected product thumbnail.

9. The method of claim 5 wherein each of the video product metadata further comprises one or more of the following:

time tag information associated with the selected product thumbnail wherein the time tag information indicates the time location within the input video of the video frame from which the selected product thumbnail was extracted; and/or a visual image of the selected product thumbnail, the visual image being retrievable to be displayed on a video display.

10. The method of claim 1 wherein analyzing the multiple video frames in each shot to detect if any of the multiple video frames contains a target product comprises using a visual analysis algorithm comprising a whole image visual classification algorithm and an object localization algorithm.

11. The method of claim 1, further comprising generating a video product index comprising at least one video product metadata, each of the video product metadata being associated with one of the selected product thumbnail and comprising the video product visual index of the selected product thumbnail associated with the video product metadata.

12. The method of claim 11 wherein the step of identifying relevant media content for at least one of the selected product thumbnails is performed after generating the video product index and the identifying is using the video product visual index in the video product metadata associated with the selected product thumbnail.

13. The method of claim 12 further comprising correlating at least one media content with the selected product thumbnail after the step of identifying relevant media content.

14. The method of claim 13 further comprising computing a product relevance score for each of the selected product thumbnail associated with one of the video product metadata, wherein the product relevance score indicates the degree of relevance of between the each media content correlated with the selected product thumbnail and the detected target product in the selected product thumbnail.

15. The method of claim 11 wherein each of the video product metadata further comprises time tag information associated with the selected product thumbnail associated with the video product metadata wherein the time tag information indicates the time location within the input video of the video frame from which the selected product thumbnail was extracted.

16. A system for transforming information provided by a computing device into computer-implementable instructions, the system comprising:

at least one processor configured for:

establishing, between a processor and the computing device, a communication channel;

receiving, by the processor from the computing device, information, including at least an input video having a plurality of video frames;

segmenting, by the processor, the input video into a plurality of shots each containing multiple video frames;

analyzing, by the processor, the multiple video frames in each shot to detect if any of the multiple video frames contains a target product;

selecting, by the processor, based on the analyzing of the multiple video frames, only video frames that have been detected by the processor to contain a detected target product;

generating, by the processor for each selected video frame that contain the detected target product, a product thumbnail, the product thumbnail being an image having a visual representation of the detected target product generated based on an image of the detected target product identified, by the processor, within the selected video frame;

detecting, by the processor, whether two or more product thumbnails within the same shot contain the same detected target product;

grouping, by the processor, the product thumbnails which contain the same detected target product derived from the same shot into respective groups;

selecting, by the processor, at least one of the product thumbnails and generating, by the processor, a video product visual index for each of the selected product thumbnails, wherein the selecting at least one of the product thumbnails comprises selecting one of the product thumbnails from at least one of the groups to represent the detected target product found in the group, and wherein the video product visual index for each selected product thumbnail is a visual representation generated based on one or more visual features of the detected target product identified, by the processor, within the selected product thumbnail; and identifying, by the processor, relevant media content from a media content database for at least one of the selected product thumbnails, the identifying comprising comparing the video product visual index of each of the selected product thumbnail with a plurality of media content visual index in the media content database, each media content visual index being associated with one media content in the media content database.

17. The system of claim 16 wherein one or more of the following apply:

for the step of detecting whether two or more product thumbnails within the same shot contain the same detected target product, the at least one processor is configured for analyzing whether the detected target products are the same by comparing similarities in one or more of the following: product visual features or location of the detected target product within the selected video frame; and/or the step of selecting one of the product thumbnails from at least one of the groups to represent the detected target product found in the group is based on image quality of the product thumbnail.

18. The system of claim 16 wherein the at least one processor is further configured for filtering out some of the product thumbnails before selecting at least one of the product thumbnails.

19. The system of claim 18 wherein the some of the product thumbnails are filtered out based on one or more of the following:

size of the group associated with the product thumbnail; and/or image quality of the product thumbnail.

20. The system of claim 16, wherein the at least one processor is further configured for correlating at least one media content with the selected product thumbnail based on the comparison.

21. The system of claim 20, wherein the at least one processor is further configured for generating a video product index comprising at least one video product metadata, each of the video product metadata being associated with one of the selected product thumbnail.

22. The system of claim 21, wherein each of the video product metadata comprises at least one media content correlated with the selected product thumbnail associated with the video product metadata, the media content retrievable to be displayed on a video display.

23. The system of claim 16, wherein the at least one processor is further configured for generating a video product index comprising at least one video product metadata, each of the video product metadata being associated with one of the selected product thumbnail and comprising the video product visual index of the selected product thumbnail.

24. The system of claim 23, wherein the step of identifying relevant media content for at least one of the selected product thumbnails is performed after generating the video product index and the identifying is using video product visual index retrieved from the video product metadata associated with the selected product thumbnail.

25. A system transforming information provided by a computing device into computer-implementable instructions, the system comprising:

a media content database comprising a plurality of media content and a plurality of media content visual index each associated with one of the media content;

a video product index database comprising a plurality of video product index each associated with one of a plurality of input videos, wherein each of the video product index comprises at least one video product metadata, each of the video product metadata comprising a video product visual index of a product thumbnail, the product thumbnail representing a detected target product found in the input video; and a product-media content search server configured to identify relevant media content for one of the input video in the video database by:

establishing, between the product-media content search server and the media content database, a communication channel;

receiving, by the product-media content search server from the media content database, the input video;

segmenting, by the product-media content search server, the input video into a plurality of shots each containing multiple video frames;

analyzing, by the product-media content search server, the multiple video frames in each shot to detect if any of the multiple video frames contains a target product;

selecting, by the product-media content search server, based on the analyzing of the multiple video frames, only video frames that have been detected by the processor to contain a detected target product;

generating, by the product-media content search server for each selected video frame that contain the detected target product, a product thumbnail, the product thumbnail being an image having a visual representation of the detected target product generated based on an image of the detected target product identified, by the product-media content search server, within the selected video frame;

detecting, by the product-media content search server, whether two or more product thumbnails within the same shot contain the same detected target product;

grouping, by the product-media content search server, the product thumbnails which contain the same detected target product derived from the same shot into respective groups;

selecting, by the product-media content search server, at least one of the product thumbnails and generating a video product visual index for each of the selected product thumbnails, wherein the selecting at least one of the product thumbnails comprises selecting one of the product thumbnails from at least one of the groups to represent the detected target product found in the group, and wherein the video product visual index for each selected product thumbnail is a visual representation generated based on one or more visual features of the detected target product identified, by the product-media content search server, within the selected product thumbnail; and comparing the video product visual index in each of the at least one video product metadata in the video product index of the input video being matched with a plurality of media content visual index in the media content database.

26. The system of claim 25 wherein one or more of the following apply:

the product-media content search server is further configured to correlate at least one media content with each of the video product visual index based on the comparison; and/or the input videos are stored in a database located together with the video product index database.

27. The system of claim 26 wherein the product-media content search server is further configured to send the correlated media content to a media content module communicatively coupled to a video player, the media content module being configured to cause the display of the correlated media content on a video display.

28. The system of claim 27 wherein the media content module forms part of the video player.

* * * * *